United States Patent
Nishihata et al.

(10) Patent No.: US 6,545,081 B1
(45) Date of Patent: Apr. 8, 2003

(54) SYNTHETIC RESIN COMPOSITION

(75) Inventors: Naomitsu Nishihata, Fukushima (JP); Kiyomi Ohuchi, Fukushima (JP); Masahito Tada, Fukushima (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/857,736

(22) PCT Filed: Dec. 8, 1999

(86) PCT No.: PCT/JP99/06870

§ 371 (c)(1),
(2), (4) Date: Jun. 8, 2001

(87) PCT Pub. No.: WO00/34369

PCT Pub. Date: Jun. 15, 2000

(30) Foreign Application Priority Data

Dec. 9, 1998 (JP) .......................................... 10-349932
Oct. 6, 1999 (JP) .......................................... 11-285004

(51) Int. Cl.$^7$ .......................... C08K 3/00; C08K 3/04; C08K 3/08; H01B 1/22; H01B 1/24

(52) U.S. Cl. ........................ 524/495; 524/545; 524/570; 524/592; 524/593; 524/601; 524/609; 428/412; 428/421; 428/480; 428/500; 428/524; 428/692; 428/694; 428/694 ML

(58) Field of Search ................................. 524/445, 495, 524/545, 570, 592, 593, 601, 609; 428/412, 421, 480, 500, 524, 692, 694, 694 ML

(56) References Cited

U.S. PATENT DOCUMENTS

| | | | |
|---|---|---|---|
| 4,038,042 A | 7/1977 | Adelman | |
| 5,688,862 A | 11/1997 | Kondou et al. | |
| 5,770,216 A | 6/1998 | Mitchnick et al. | |

FOREIGN PATENT DOCUMENTS

| | | |
|---|---|---|
| EP | 0522760 | 1/1993 |
| EP | 0874024 | 10/1998 |
| JP | 9-087418 | 3/1997 |

Primary Examiner—Kriellion A. Sanders
(74) Attorney, Agent, or Firm—Dinsmore & Shohl LLP

(57) ABSTRACT

A moderately conductive synthetic resin composition comprising a synthetic resin (A), a carbon precursor (B) and at least one conductive filler (C) selected from the group consisting of a non-fibrous conductive filler and a metallic fibrous material, both, having a volume resistivity lower than $10^2$ Ω·cm, and a moderately conductive synthetic resin composition comprising a synthetic resin (A), a carbon precursor (B) and carbon fiber (E).

24 Claims, No Drawings

SYNTHETIC RESIN COMPOSITION

TECHNICAL FIELD

The present invention relates to synthetic resin compositions, and more particularly to synthetic resin compositions in which the volume resistivity is in a moderately conductive region, can be strictly controlled to a desired value within this region, can be developed in the moderately conductive region with good reproducibility and is scarcely varied by melt forming or molding.

The present invention also relates to formed or molded products obtained by forming or molding such a synthetic resin composition. The synthetic resin compositions and formed or molded products according to the present invention can be suitably applied to a wide variety of fields of which control of static electricity, prevention of electrification, electromagnetic interference shielding, prevention of dust collection, etc. are required.

The present invention further relates to synthetic resin compositions in which the surface resistivity can be strictly controlled at a specific value within a moderately conductive region, a scatter of the surface resistivity with the locality is narrow, and the mechanical properties are excellent. The synthetic resin compositions according to the present invention can be formed into formed or molded products which have a surface resistivity of $10^5$ to $10^{12}\Omega$ (=$\Omega/\square$), are excellent in mechanical properties and extremely small in exudation of impurities, and so it is suitable for use as a molding material for carriers such as a carrier box which is a container for shipping or storing wafers.

BACKGROUND ART

Resin materials having a volume resistivity ranging from $10^5$ to $10^{13}$ $\Omega\cdot$cm are generally referred to as moderately conductive resin materials (moderately conductive plastics) because the volume resistivity is situated between an insulator and a metallic conductor. Such moderately conductive resin materials are applied to a wide variety of fields as, for example, films for packaging electronic parts, sheathing materials for OA apparatus, etc. making good use of their antistatic property, anti-dust-collecting property, electromagnetic interference shielding ability and the like. The moderately conductive resin materials are used in field of which control of static electricity is required, as, for example, resin materials for charging rolls, charging belts, static charge eliminating belts, etc. in image forming apparatus such as electrophotographic copying machines and electrostatic recording apparatus.

Although the moderately conductive resin materials include those that the synthetic resin itself is moderately conductive, most thereof are synthetic resin compositions obtained by blending a conductive filler such as conductive carbon black, metallic powder, metal fiber or carbon fiber into a synthetic resin, which is an insulator, to impart moderately conductivity to the resin. However, the volume resistivity of a synthetic resin composition obtained by blending a conductive filler into a synthetic resin depends on the dispersed state and content of the filler in the synthetic resin. Therefore, there have been encountered problems that (1) the volume resistivity greatly varies even when the blending proportion of the conductive filler is changed to a slight extent, (2) the distribution of the volume resistivity is uneven, and the volume resistivity greatly varies with the locality, (3) the volume resistivity greatly varies when the synthetic resin composition is melt formed or molded, and (4) the loaded amount of the conductive filler must be increased in order to attain a volume resistivity within the moderately conductive region, and consequently the molding and processing ability and mechanical strength of the resulting synthetic resin composite material are lowered, or its hardness becomes too high. Accordingly, it has been extremely difficult to provide a synthetic resin composition having a desired volume resistivity with good reproducibility.

More specifically, in the case where a synthetic resin and a conductive filler are blended to prepare a synthetic resin composition, the volume resistivity of the resulting synthetic resin composition is liable to rapidly change according to a change in the content of the conductive filler, since a difference in volume resistivity between both components is great, and the development of conductivity (lowering of the volume resistivity) depends on the dispersed state and content of the conductive filler. The change in the volume resistivity of the synthetic resin to the change in the content of the conductive filler is rapid when the volume resistivity of the synthetic resin composition falls within the moderately conductive region of $10^5$ to $10^{13}$ $\Omega\cdot$cm in particular. In addition, when the conductive filler is not evenly dispersed, a scatter of volume resistivity with the locality becomes wide. Accordingly, it has been very difficult to stably produce a synthetic resin composition having a volume resistivity within the range of $10^5$ to $10^{13}$ $\Omega\cdot$cm with good reproducibility.

In synthetic resin compositions obtained by incorporating conductive carbon black having a high DBP oil absorption or a certain kind of graphite into a synthetic resin, a synthetic resin composition having a desired volume resistivity within a range of $10^3$–$10^{13}$ $\Omega\cdot$cm can be provided with a certain probability by strictly controlling raw materials used and processing conditions.

However, this synthetic resin composition has involved problems that the reproducibility of volume resistivity is insufficient and that the volume resistivity greatly varies when the synthetic resin composition is formed into a molded product by a melt molding process such as injection molding. Further, molded products obtained from this synthetic resin composition have involved a problem that the volume resistivity varies during their use by wearing.

Carriers of various forms such as carrier boxes are used for shipping or storing wafers, semiconductor devices (IC, LSI, etc.), electronic parts (semiconductor devices, circuit parts, functional parts, etc.), information recording media (magnetic disks, optical disks, etc.) and the like. The carriers are generally formed with a synthetic resin material. Such a carrier is required to have a moderate surface resistivity, not to contaminate wafers and the like by exudation of impurities, emission of gases, or the like and to be also excellent in mechanical strength. In many cases, the carrier is required to have excellent water resistance, heat resistance, chemical resistance, etc.

More specifically, when silicon wafers or magnetic disks are subjected to a processing treatment, a carrier is used for shipping or storing them. For example, the wafers are subjected to treatments such as oxidation, thin-film formation by CVD, ion implantation and photo processing (resist treatment, exposure, development, washing, dry etching, sputtering, etc.) in a wafer treatment process to provide them as semiconductor devices. The semiconductor devices are mounted on a wiring board in an assembly process to foam electronic parts. In the wafer treatment process, the carrier for shipping wafers is immersed in hot water and/or a chemical agent and dried. When a carrier having a surface resistivity higher than $10^{12}\Omega$ is used, the carrier is charged to high voltage to damage semiconductor devices or the like. The carrier having a high surface resistivity tends to charge and thus collects dust and the like suspended in the air, thereby contaminating the semiconductor devices or the like.

When a carrier having a surface resistivity lower than $10^5\Omega$ is used on the other hand, rapid discharging occurs when an electronic part electrified, short-circuited or charged is brought into contact with the carrier, thereby easily damaging semiconductor devices or the like. As described above, it is necessary to strictly control the surface resistivity of the carrier within a range of $10^5$ to $10^{12}\Omega$ in order to protect the wafers, semiconductor devices, electronic parts, information recording media, etc. from static electricity and keep a proper air cleanliness class without collecting dust and the like.

Since a synthetic resin itself is generally an insulator, as methods for lowering the surface resistivity of a formed or molded product thereof, there have heretofore been known, for example, (1) a method in which an antistatic agent is applied to the surface of the formed or molded product, (2) a method in which a resin composition with an antistatic agent kneaded into a synthetic resin is used to conduct forming or molding, and (3) a method in which a resin composition with a conductive filler such as conductive carbon black incorporated in a synthetic resin is used to conduct forming or molding. In the method in which the antistatic agent is applied to the surface of the formed or molded product, however, the antistatic agent is easily removed by wiping or washing the surface thereof. In addition, there is encountered a problem that semiconductor devices and the like are contaminated by attachment of the antistatic agent.

In the method in which an antistatic agent is kneaded into the synthetic resin, the formed or molded product tends to lose the antistatic property when the antistatic agent exuded out of the surface thereof is removed by water washing or rubbing. In addition, semiconductor devices and the like are contaminated with the antistatic agent bled out of the surface of the formed or molded product, or with dust and the like stuck thereon. The antistatic agent pollutes ambient environment by its exudation or volatilization.

According to the method in which the conductive filler is incorporated into the synthetic resin, a carrier which does not pollute the semiconductor devices and the like can be produced. However, this method involves the above-described problems. Namely, the volume resistivity of the resin composition is rapidly changed even by a slight change in the content of the conductive filler, since a difference in volume resistivity between the conductive filler and the synthetic resin is great, and the development of conductivity depends on the dispersed state of the conductive filler. Therefore, the surface resistivity of the resultant formed or molded product is also rapidly changed.

The change in the surface resistivity of the formed or molded product according to the change in the content of the conductive filler is rapid in a surface conductivity region required of carriers such as a wafer carrier in particular. In addition, when the conductive filler is not evenly dispersed in the synthetic resin, a scatter of the surface resistivity of the formed or molded product with the locality becomes wide. Therefore, it has been difficult to stably produce a foamed or molded product such as a carrier, which is exactly controlled to a desired surface resistivity within a range of $10^5$ to $10^{12}\Omega$, and exhibits fixed charging characteristics even in any position, using a synthetic resin composition containing a conductive filler. With the enlargement in size of silicone wafers and semiconductor devices in recent years, carriers are required to improve creep characteristics, modulus of elasticity, strength, etc. because higher stress than before is applied to the carriers during their use. However, it has been difficult to satisfy these various requirements by the prior art.

Japanese Patent Application Laid-Open No. 87418/1997 discloses synthetic resin compositions comprising a synthetic resin and particles of a carbon precursor. However, the synthetic resin compositions have involved a problem that the use of the synthetic resin and carbon precursor particles alone requires to fill a large amount of the carbon precursor particles in order to control the volume resistivity of the resulting resin composition within a range of $10^5$ to $10^{13}$ $\Omega \cdot cm$, so that the melt flowability upon forming or molding and processing and mechanical strength of the resulting synthetic resin composition are lowered to a great extent. In the synthetic resin compositions described in this publication, those containing carbon fiber in a relatively large amount are wide in the scatter of surface resistivity with the locality.

DISCLOSURE OF THE INVENTION

It is an object of the present invention to provide a synthetic resin composition in which the volume resistivity can be strictly controlled to a desired value within a moderately conductive region, can be developed with good reproducibility and is scarcely varied by melt forming or molding conditions.

Another object of the present invention is to provide a synthetic resin composition in which the volume resistivity of a formed or molded product obtained therefrom can be controlled so as to differ between the outer layer (surface part) and the interior of the formed or molded product within a desired range.

A further object of the present invention is to provide a formed or molded product obtained from such a synthetic resin composition.

A still further object of the present invention is to provide a synthetic resin composition in which the surface resistivity can be strictly controlled to a desired value within a moderately conductive region and developed with good reproducibility, the mechanical properties are excellent, and exudation of impurities is extremely small.

A yet still further object of the present invention is to provide a formed or molded product of a synthetic resin, in which the surface resistivity is in a moderately conductive region, the mechanical properties are excellent, and exudation of impurities is extremely small.

A particular object of the present invention is to provide a carrier such as a wafer carrier, in which the surface resistivity is within a range of $10^5$ to $10^{12}\Omega$ (=$\Omega$/□), a scatter of the surface resistivity with the locality is narrow, the mechanical properties are excellent, and exudation of impurities is extremely small.

The present inventors have carried out an extensive investigation with a view toward solving the above-described problems involved in the prior art. As a result, it has been found that when a carbon precursor having a volume resistivity of $10^2$ to $10^{10}$ $\Omega \cdot cm$ and a non-fibrous conductive filler and/or a metallic fibrous material (hereinafter, both, referred to as "conductive filler") which have a volume resistivity lower than $10^2$ $\Omega \cdot cm$ are blended in combination in specific proportions into a synthetic resin to prepare a synthetic resin composition (1), the above objects can be achieved. The synthetic resin composition (1) has features that the volume resistivity can be strictly controlled to a desired value within a range of $10^5$ to $10^{13}$ $\Omega \cdot cm$, the reproducibility of the volume resistivity is excellent, and a variation in volume resistivity is small under conditions of melt forming or molding and processing such as injection molding or extrusion.

The synthetic resin composition (1) according to the present invention permits changing the volume resistivity of a formed or molded product obtained therefrom between the outer layer and the interior thereof by controlling the kinds and blending proportions of the carbon precursor and conductive filler, whereby for example, the volume resistivities of the outer layer and the interior of the formed or molded product may be controlled to a volume resistivity within the moderately conductive region and a volume resistivity within a conductive region (generally, not lower than $0.1 \times 10^1$ $\Omega \cdot cm$, but lower than $10^5$ $\Omega \cdot cm$), respectively. The formed or molded product the volume resistivity of which differs between the outer layer and the interior, is useful as, for example, an electromagnetic interference shielding member. According to the synthetic resin composition (1) of the present invention, the volume resistivity in the moderately conductive region can be achieved even when the blending proportion of the conductive filler, or the total blending proportion of the carbon precursor and conductive filler is relatively low.

The present inventors have further found that a surface resistivity can be strictly controlled to a desired value within the moderately conductive region by a synthetic resin composition (2) obtained by blending the above-described carbon precursor and carbon fiber having a volume resistivity lower than $10^2$ $\Omega \cdot cm$ in combination in specific proportions into a synthetic resin. By blending the carbon fiber in a relatively low proportion, a formed or molded product, in which a scatter of surface resistivity with the locality is extremely small, can be provided when the synthetic resin composition is formed or molded. The blending of the carbon fiber also permits improving mechanical properties such as flexural modulus.

The synthetic resin composition (2) according to the present invention can reduce emission of gases and exudation of metals and other impurities to an extremely small extent. The synthetic resin composition (2) according to the present invention can be formed into various kinds of formed or molded products in a wide variety of fields of which a surface reactivity in the moderately conductive region is required. In particular, it is suitable for use as a carrier for wafers, semiconductor devices, electronic parts or information recording media.

The present invention has been led to completion on the basis of these findings.

According to the present invention, there is provided a synthetic resin composition comprising 40 to 98.5 wt. % of a synthetic resin (A), 1 to 40 wt. % of a carbon precursor (B) having a volume resistivity of $10^2$ to $10^{10}$ $\Omega \cdot cm$ and 0.5 to 30 wt. % of at least one conductive filler (C) selected from the group consisting of a non-fibrous conductive filler and a metallic fibrous material, both, having a volume resistivity lower than $10^2$ $\Omega \cdot cm$.

According to the present invention, there is also provided a synthetic resin composition comprising 46 to 98.5 wt. % of a synthetic resin (A), 1 to 40 wt. % of a carbon precursor (B) having a volume resistivity of $10^2$ to $10^{10}$ $\Omega \cdot cm$ and 0.5 to 14 wt. % of carbon fiber (E) having a volume resistivity lower than $10^2$ $\Omega \cdot cm$.

BEST MODE FOR CARRYING OUT THE INVENTION

1. Synthetic Resin

No particular limitation is imposed on the synthetic resin useful in the practice of the present invention, and examples thereof include polyamide, polyacetal, thermoplastic polyester (for example, polybutylene terephthalate, polyethylene terephthalate), polyolefins (for example, polyethylene, polypropylene, polybutene, polyisobutene), polyvinyl chloride, polyvinylidene chloride, poly(p-xylene), polycarbonate, modified poly(phenylene ether), polyurethane, polydimethylsiloxane, polystyrene, ABS resins, poly(methyl methacrylate), poly(phenylene sulfide), poly(ether ether ketone), poly(ether ketone), poly(phenylene sulfide ketone), poly(phenylene sulfide sulfone), poly(ether nitrile), aromatic polyester, fluorocarbon resins, polyarylate, polysulfone, poly(ether sulfone), polyether imide, polyamide-imide, polyimide, polyaminobismaleimide, diallyl terephthalate resins, triazine resins, epoxy resins, phenol resins, and modified product thereof.

Examples of the fluorocarbon resins include tetrafluoroethylene/hexafluoropropylene copolymers (FEP), tetrafluoroethylene/perfluoroalkyl vinyl ether copolymers (PFA), polychlorotrifluoroethylene, polyvinylidene fluoride (PVDF), vinylidene fluoride/hexafluoropropylene/tetrafluoroethylene copolymers, polyvinyl fluoride and ethylene/tetrafluoroethylene copolymers.

Of these synthetic resins, thermoplastic resins are preferred, and crystalline resins having a crystalline melting point of at least 100° C. and amorphous resins having a glass transition temperature of at least 100° C. are more preferred from the viewpoint of heat resistance.

Particularly preferred thermoplastic resins include thermoplastic polyester such as polybutylene terephthalate (PBT), poly(arylene sulfides) typified by poly(phenylene sulfide) (PPS), polyolefins such as polypropylene (PP) and polyethylene (PE), polycarbonate (PC), poly(ether ether ketone) (PEEK), polyacetal (polyoxymethylene; POM), fluorocarbon resins such as PFA, etc.

These synthetic resins may be used either singly or in any combination thereof. Since carriers such as wafer carriers are required to extremely reduce emission of volatile gasses and exudation of metals, it is desired that a synthetic resin produced and purified in view of emission of volatile gases and exudation of metals be used when the synthetic resin is used in an application field of carriers.

2. Carbon Precursor

The carbon precursor having a volume resistivity within a range of $10^2$ to $10^{10}$ $\Omega \cdot cm$, which is useful in the practice of the present invention, can be obtained by calcining an organic substance at a temperature of 400 to 900° C. in an inert atmosphere. Such a carbon precursor can be produced, for example, in accordance with (i) a process in which tar or pitch such as petroleum tar, petroleum pitch, coal tar or coal pitch is heated to conduct aromatization and polycondensation, and then oxidized and non-fusibilized in an oxidizing atmosphere as needed, and the resultant product is further heated and calcined in an inert atmosphere, (ii) a process in which a thermoplastic resin such as polyacrylonitrile or polyvinyl chloride is non-fusibilized in an oxidizing atmosphere and further heated and calcined in an inert atmosphere, or (iii) a process in which a thermosetting resin such as a phenol resin or furan resin is set by heating and then heated and calcined in an inert atmosphere. The carbon precursor means a substance which has a carbon content of at most 97 wt. % and is not completely carbonized.

When an organic substance is heated and calcined in an inert atmosphere, the carbon content in the resulting calcined product increases as the calcining temperature is raised. The carbon content in the carbon precursor can be easily controlled by properly presetting the calcining temperature. The carbon precursor used in the present invention is preferably a carbon precursor which has a carbon content of generally 80 to 97 wt. %, preferably 85 to 95 wt. %, i.e., is in a state incompletely carbonized.

If the carbon content in the carbon precursor is too low, the volume resistivity and surface resistivity of the resulting synthetic resin composition become high, and it is hence difficult to control these values within respective desired ranges. If the carbon content in the carbon precursor is too high, the volume resistivity and surface resistivity of the resulting synthetic resin composition become too low and liable to rapidly change even when the blending proportion of the carbon precursor is slightly changed. Accordingly, the use of a carbon precursor having a carbon content outside the above range makes it difficult to stably produce a formed or molded product having a volume resistivity and a surface resistivity within respective desired ranges with good reproducibility. The volume resistivity of the carbon precursor is preferably $10^3$ to $10^9$ $\Omega \cdot cm$, more preferably $10^4$ to $10^8$ $\Omega \cdot cm$.

The carbon precursor is generally used in the form of particles or fiber. The average particle diameter of the carbon precursor particles used in the present invention is preferably 1 mm or smaller. If the average particle diameter of the carbon precursor is too great, it is difficult to provide a formed or molded product having good appearance. The average particle diameter of the carbon precursor is preferably 0.1 $\mu$m to 1 mm, more preferably 1 $\mu$m to 0.1 mm, most preferably 5 to 500 $\mu$m. In many cases, the use of the carbon precursor having an average particle diameter of about 5 to 50 $\mu$m can yield good results. The average diameter of the carbon precursor fiber is preferably 0.1 mm or small. If the average diameter of the carbon precursor fiber exceeds 0.1 mm, it is difficult to provide a formed or molded product having good appearance. The carbon precursor fiber is preferably short fiber from the viewpoint of dispersibility.

3. Conductive Filler

No particular limitation is imposed on the non-fibrous conductive filler having a volume resistivity lower than $10^2$ $\Omega \cdot cm$, which is useful in the practice of the present invention. Examples thereof include graphite, conductive carbon black and metallic powder. Of these, conductive carbon materials such as graphite, conductive carbon black and mixtures thereof are preferred from the viewpoints of easy control and reproducibility of the volume resistivity. The conductive carbon materials are generally in the form of powder or flaky particles.

No particular limitation is imposed on the conductive carbon black so far as it has a volume resistivity lower than $10^2$ $\Omega \cdot cm$, and examples thereof include acetylene black, oil furnace black, thermal black and channel black. These are may be used either singly on in any combination thereof.

The use of conductive carbon black having a DBP oil absorption as high as at least 250 ml/100 g, preferably at least 300 ml/100 g makes the volume resistivity of the interior of the resulting formed or molded product lower relative to the outer layer thereof. Therefore, it is possible to properly use various kinds of conductive carbon black different in DBP oil absorption from each other according to applications and purposes. The DBP oil absorption of the conductive carbon black is determined by the method prescribed in ASTM D 2414. More specifically, a carbon black sample is placed in a chamber of a measuring apparatus (Absorpotometer), and DBP (n-dibutyl phthalate) is added at a constant rate to the chamber. The viscosity of the conductive carbon black increases as it absorbs DBP. The DBP oil absorption is calculated out from the amount of DBP absorbed until the viscosity reaches a certain value. The detection of the viscosity is conducted by a torque sensor.

No particular limitation is imposed on the graphite used in the present invention so far as it has a volume resistivity lower than $10^2$ $\Omega \cdot cm$, and artificial graphite obtained by subjecting coke, tar, pitch or the like to a graphitizing treatment at a high temperature, or natural graphite such as lepidoblastic graphite, flake graphite or earthy graphite may be used.

Examples of the metallic fibrous material used in the present invention include metallic fibers such as stainless steel, aluminum, titanium, steel and brass.

The volume resistivity of the conductive filler used in the present invention is not lower than $10^2$ $\Omega \cdot cm$, and its lower limit is generally the volume resistivity of a metallic material such as metallic powder or metallic fiber.

4. Carbon Fiber

No particular limitation is imposed on the carbon fiber used in the present invention so far as it has a volume resistivity lower than $10^2$ $\Omega \cdot cm$, and various kinds of carbon fiber, such as cellulosic, polyacrylonitrile (PAN), lignin, pitch (coal pitch, petroleum pitch)-based may be used. Of these, PAN-based carbon fiber, pitch-based carbon fiber and mixtures thereof are preferred, with PAN-based carbon fiber being particularly preferred.

The average diameter of the carbon fiber is preferably 0.1 mm or small. If the average diameter exceeds 0.1 mm, it is difficult to provide a formed or molded product having good appearance. The carbon fiber is preferably short fiber having an average fiber length of at least 50 $\mu$m. When average fiber length of the carbon fiber is at least 50 $\mu$m, an effect to improve mechanical properties such as creep characteristics, modulus of elasticity and strength is markedly exhibited. The upper limit of the average fiber length of the carbon fiber before mixing is generally about 80 mm. The upper limit of the average fiber length of the carbon fiber in the resulting synthetic resin composition after mixing and extrusion is about 1,000 $\mu$m.

5. Other Fillers

Other fillers than those described above may be blended into the resin compositions according to the present invention for the purpose of improving mechanical strength and heat resistance.

Examples of the other fillers include fibrous fillers, such as inorganic fibrous materials such as glass fiber, asbestos fiber, silica fiber, alumina fiber, zirconia fiber, boron nitride fiber, silicon nitride fiber, boron fiber and potassium titanate fiber and high-melting organic fibrous materials such as polyamide, fluorocarbon resins, polyester resins and acrylic resins.

As other examples of the other fillers, may be mentioned non-fibrous fillers such as mica, silica, talc, alumina, kaolin, calcium sulfate, calcium carbonate, titanium oxide, ferrite, clay, glass powder, zinc oxide, nickel carbonate, iron oxide, quartz powder, magnesium carbonate and barium sulfate. The non-fibrous fillers are generally in the form of powder or flaky particles.

These fillers may be use either singly or in any combination thereof. The fillers may be treated with sizing or surface-treating agents as needed. Examples of the sizing or surface-treating agents include functional compounds such as epoxy compounds, isocyanate compounds, silane compounds and titanate compounds. These compounds may be used for conducting a surface treatment or collecting treatment to the fillers in advance or added at the same time as the fillers upon the preparation of the synthetic resin composition.

Of these fillers, inorganic fibrous fillers having no conductivity, such as glass fiber, and non-fibrous fillers having no conductivity, such as talc and calcium carbonate, are preferred from the viewpoint of strictly controlling the volume resistivity or surface resistivity of the resulting synthetic resin and at the same time improving the mechanical strength and heat resistance.

6. Additives

To the synthetic resin compositions according to the present invention, may be suitably added, for examples, impact modifiers such as epoxy group-containing α-olefin copolymers; resin-modifying agents such as ethyleneglycidyl methacrylate; lubricants such as pentaerythritol tetrastearate; thermosetting resins; antioxidants; ultraviolet absorbents; nucleating agents such as boron nitride; flame retardants; colorants such as dyes and pigments; etc. as additives.

7. Synthetic Resin Composition

<Synthetic Resin Composition (1)>

The synthetic resin composition (1) according to the present invention is a synthetic resin composition comprising 40 to 98.5 wt. % of a synthetic resin (A), 1 to 40 wt. % of a carbon precursor (B) having a volume resistivity of $10^2$ to $10^{10}$ Ω·cm and 0.5 to 30 wt. % of at least one conductive filler (C) selected from the group consisting of a non-fibrous conductive filler and a metallic fibrous material, both, having a volume resistivity lower than $10^2$ Ω·cm. The synthetic resin composition (1) may contain 0 to 60 wt. % of any other fillers (D) if desired. As the other fillers (D), non-conductive inorganic fillers are preferred, with non-conductive inorganic fibrous fillers such as glass fiber, and non-conductive non-fibrous inorganic fillers such as talc and calcium carbonate being particularly preferred. The proportions of the respective components are based on the total weight of the synthetic resin composition and amount to 100 wt. % in total.

The volume resistivity of the synthetic resin composition (1) is preferably $10^5$ to $10^{13}$ Ω·cm in a moderately conductive region from the viewpoint of its application fields.

The proportion of the synthetic resin (A) in the synthetic resin composition (1) is preferably 46 to 98.5 wt. %. In many cases, good results can be yielded when the proportion of the synthetic resin (A) is within a range of 46 to 97 wt. %. If the proportion of the synthetic resin is too high, it is impossible to sufficiently lower the volume resistivity of the resulting synthetic resin composition, and so it is difficult to provide a synthetic resin composition having a desired volume resistivity within the moderately conductive region. If the proportion of the synthetic resin is too low, the volume resistivity of the resulting synthetic resin composition becomes too low, and so it is difficult to provide a synthetic resin composition having a desired volume resistivity within the moderately conductive region.

The proportion of the carbon precursor (B) in the synthetic resin composition (1) is preferably 1 to 35 wt. %, more preferably 3 to 30 wt. %. In the synthetic resin composition (1), in many cases, the desired volume resistivity can be stably achieved If the proportion of the carbon precursor (B) is as low as about 3 to 15 wt. %. If the proportion of the carbon precursor (B) is too high, the volume resistivity of the resulting synthetic resin composition becomes too low, and so it is difficult to control the volume resistivity within a range of $10^5$ to $10^{13}$ Ω·cm. If the proportion of the carbon precursor (B) is too low, it is difficult to sufficiently lower the volume resistivity of the resulting synthetic resin composition or to control the volume resistivity within a range of $10^5$ to $10^{13}$ Ω·cm.

The proportion of the conductive filler (C) in the synthetic resin composition (1) is preferably 0.5 to 25 wt. %, more preferably 0.5 to 14 wt. %. It is particularly preferred that the lower limit of the blending proportion of the conductive filler (C) be 1 wt. %. If the proportion of the conductive filler (C) is too high, the volume resistivity of the resulting synthetic resin composition becomes too low, and so it is difficult to control the volume resistivity within a range of to $10^5$ to $10^{13}$ Ω·cm. If the proportion of the n on-fibrous conductive filler (C) is too low, it is difficult to sufficiently lower the volume resistivity of the resulting synthetic resin composition or to control the volume resistivity within a range of $10^5$ to $10^{13}$ Ω·cm.

When the other fillers (D) are blended, the blending proportion thereof is preferably 1 to 50 wt. %, more preferably 5 to 50 wt. % based on the total weight of the synthetic resin composition. By blending the other fillers (D), the mechanical properties, heat resistance and the like of the resulting synthetic resin composition can be improved.

In the synthetic resin composition (1) according to the present invention, it is desirable to lower the proportion of the conductive filler (C) as much as possible in order to strictly control the volume resistivity to a desired value within the moderately conductive region.

From this point of view, a synthetic resin composition comprising 46 to 98.5 wt. % of the synthetic resin (A), 1 to 40 wt. % of the carbon precursor (B) and 0.5 to 14 wt. % of the conductive filler (C) is preferred. In the synthetic resin composition (1) according to the present invention, it is possible to lower the proportions of both carbon precursor (B) and conductive filler (C). In this case, the proportion of the carbon precursor (B) can be lowered to about 3 to 15 wt. %. Further, the total proportion of the carbon precursor (B) and conductive filler (C) may be lowered to preferably at most 30 wt. %, more preferably at least 25 wt. %.

<Synthetic Resin Composition (2)>

The synthetic resin composition (2) according to the present invention is a synthetic resin composition comprising 46 to 98.5 wt. % of a synthetic resin (A), 1 to 40 wt. % of a carbon precursor (B) having a volume resistivity of $10^2$ to $10^{10}$ Ω·cm and 0.5 to 14 wt. % of carbon fiber (E) having a volume resistivity lower than $10^2$ Ω·cm. The synthetic resin composition (2) according to the present invention may contain 0 to 60 wt. % of any other fillers (D) if desired. As the other fillers, non-conductive inorganic fillers are preferred, with non-conductive inorganic fibrous fillers such as glass fiber, and non-conductive non-fibrous inorganic fillers such as talc and calcium carbonate being particularly preferred. The proportions of the respective components are based on the total weight of the synthetic resin composition and amount to 100 wt. % in total.

The surface resistivity of the synthetic resin composition (2) is preferably $10^5$ to $10^{12}$ Ω viewpoint of its application fields.

The proportion of the synthetic resin (A) in the synthetic resin composition (2) is preferably 51 to 94 wt. %, more preferably 57 to 90 wt. %, most preferably 60 to 85 wt. %. If the proportion of the synthetic resin (A) is too high, it is difficult to lower the surface resistivity of the resulting formed or molded product to a desired level. If the proportion of the synthetic resin (A) is too low, proportions of the carbon precursor and carbon fiber become higher, so that the surface resistivity of the resulting formed or molded product becomes too low.

The proportion of the carbon precursor (B) in the synthetic resin composition (2) is preferably 5 to 35 wt. %, more preferably 8 to 30 wt. %, most preferably 10 to 30 wt. %. If the proportion of the carbon precursor (B) is too high, the surface resistivity of the resulting formed or molded product becomes too low, and so it is difficult to control the surface resistivity within a range of $10^5$ to $10^{12}\Omega$, which is suitable for carriers in particular. If the proportion of the carbon precursor (B) is too low, it is difficult to sufficiently lower the surface resistivity of the resulting formed or molded product or to control the surface resistivity within a surface resistivity range that is suitable for carriers.

The proportion of the carbon fiber (E) in the synthetic resin composition (2) is preferably 1 to 14 wt. %, more preferably 2 to 13 wt. %, most preferably 5 to 10 wt. %. If the proportion of the carbon fiber (E) is too high, the surface resistivity of the resulting formed or molded product becomes too low, and so it is difficult to control the surface resistivity within a surface resistivity range that is suitable for carriers.

Besides, if the proportion of the carbon fiber (E) in the synthetic resin composition (2) is too high, a scatter of surface resistivity with the locality tends to become wide when the synthetic resin composition is formed into a molded product such as a wafer carrier. The molded product obtained by molding the synthetic resin composition (2) is desirably extremely narrow in the scatter of surface resistivity with the locality from the viewpoint of exhibiting stable charging characteristics and the like. In the measurement (the measuring method will be described subsequently) of the surface resistivity of the molded product, it is desired that a ratio ($\Omega_L/\Omega_S$) of the maximum surface resistivity $\Omega_L$ to the minimum surface resistivity $\Omega_S$ be preferably 10 or lower, more preferably 6.5 or lower, most preferably 6 or lower from the viewpoint of exhibiting stable various properties.

If the proportion of the carbon fiber (E) is too low, it is difficult to sufficiently lower the surface resistivity of the resulting formed or molded product or to control the surface resistivity within a surface resistivity range that is suitable for carriers in particular. Besides, if the proportion of the carbon fiber (E) is too low, an effect to improve mechanical properties such as creep characteristics, modulus of elasticity and strength becomes little.

<Preparation Process>

The synthetic resin compositions (1) and (2) according to the present invention can be prepared by equipment and methods generally used in the preparation of synthetic resin compositions. For example, individual raw components can be premixed in a Henschel mixer, tumbler or the like, fillers such as glass fiber and additives are added to the premix, if necessary, to further mix their components, the resultant mixture is then kneaded in a single-screw or twin-screw extruder and extruded into pellets for molding or forming. There may also be used a method in which part of the necessary components are mixed to prepare a masterbatch, and the masterbatch is then mixed with the remaining components, or a method in which part of raw materials used are ground for the purpose of enhancing the dispersibility of the individual components, thereby making the particle sizes of the components uniform, and they are mixed and melt-extruded.

8. Formed or Molded Product and Application Field

The synthetic resin compositions (1) and (2) according to the present invention can be formed into formed or molded products of various shapes, for example, sheets, films, tubes, containers, etc. by conventional melt processing techniques such as injection molding and extrusion. The formed or molded products obtained by forming or molding the synthetic resin compositions according to the present invention can be suitably applied to a wide variety of fields of which control of static electricity, prevention of electrification, electromagnetic interference shielding, prevention of dust collection, etc. are required.

In particular, when the synthetic resin composition (1) according to the present invention is used, a formed or molded product which is narrow in the scatter of volume resistivity with the locality can be provided. On the other hand, when the kinds and blending proportions of the carbon precursor and non-fibrous conductive filler are controlled, the volume resistivity of the resulting formed or molded product can be changed between the outer layer and the interior thereof as needed. For example, the volume resistivities of the outer layer and the interior of the formed or molded product may be controlled to a volume resistivity within the moderately conductive region and a volume resistivity within a conductive region (generally, not lower than $0.1\times10^1$ $\Omega$·cm, but lower than $10^5$ $\Omega$·cm), respectively. The formed or molded product the volume resistivity of which differs between the outer layer and the interior, is useful as, for example, an electromagnetic interference shielding member. It goes without saying that a formed or molded product the volume resistivities of the outer layer and the interior of which are both within a range of $10^5$ to $10^{13}$ $\Omega$·cm can be obtained with the synthetic resin composition (1) according to the present invention.

The synthetic resin composition (2) according to the present invention can be suitably used as various kinds of formed or molded products in a wide variety of fields of which a surface resistivity within the moderately conductive region is particularly required.

Examples of specific uses of the synthetic resin compositions according to the present invention include tote bins, wafer boats, wafer carriers, wafer cassettes, IC chip trays, IC chip carriers, IC shipping tubes, IC cards, tape and reel packing, equipment cases, storage trays, storage bins, transport enclosures, magnetic card readers, computer housings, modem housings, monitor housings, CR-ROM housings, printer housings, connectors, HD carriers, MR head carriers, GMR head carriers, HAS carriers, VCM in HDD, liquid crystal panel carriers in an electric and electronic field.

In a field of OA machines, may be mentioned charging members such as charging rolls, charging belts, static charge eliminating belts, transfer rolls, transfer belts and developing rolls in image forming apparatus such as electrophotographic copying machines and electrostatic recording apparatus; and transfer drums, bushings, paper and paper money carrying parts, paper feed rails, font cartridges, ink ribbon canisters, guide pins, trays, rollers, gears, sprockets, printer housings and connectors for recording apparatus.

In a field of communication apparatus, may be mentioned portable telephone parts, pagers, cellular phone parts and various kinds of lubricating materials.

In a field of automobiles, may be mentioned interiors, underhoods, electronic housings, gas tank caps, fuel filters, fuel line connectors, fuel line clips, fuel reservoirs or tanks, instrument bezels, door handles, fuel lines and other various parts.

In other fields than those described above, may be mentioned wire and power cable sheathing materials, wire supporters, electromagnetic wave absorbers, floor coverings, carpets, insect proofing sheets, pallets, shoe soles, tapes, brushes, fan blades, flat heaters, polyswitches, etc.

The synthetic resin composition (2) according to the present invention is particularly suitable for use as a carrier for shipping or storing wafers, semiconductor devices (IC, LSI, etc.), electronic parts (semiconductor devices, circuit parts, functional parts, etc.), information recording media (magnetic disks, optical disks, etc.) and the like. The shape and size of the carrier may be suitably determined according to its specific uses. However, specific examples thereof include molded or formed products in the form of a single-stage and single-layer container such as a carrier box, multi-stage and multi-layer container, tray, sheet, or the like.

EXAMPLES

The present invention will hereinafter be described more specifically by the following Examples and Comparative Examples. However, the present invention is not limited to these examples only.

Physical properties in the examples were determined in accordance with the following respective methods.

(1) Volume Resistivity

The volume resistivity of each sample was measured under applied voltage of 100 V in accordance with JIS K 6911 when the volume resistivity was at least $10^8$ $\Omega \cdot cm$. When the volume resistivity was lower than $10^8$ $\Omega \cdot cm$, it was measured in accordance with JIS K 7194 (four probe method of the resistivity measurement for conductive plastics).

The volume resistivity of the outer layer of a molded product sample was measured by using an injection molded product (130 mm×100 mm×3 mm; flat plate) as it is, while the volume resistivity of the interior of the molded product sample was measured on a flat plate about 1 mm thick obtained by planing both sides of the molded product in a thickness direction by each about 1 mm.

(2) Surface Resistivity

When the surface resistivity of a sample was at least $10^6 \Omega$, the surface resistivity thereof was measured under applied voltage of 100 V using a d-c amplifier (300-1 A model, manufactured by Kikusuisha), an ammeter (616 model, manufactured by Keithley Co.) and a sample cell (1608A model, manufactured by YOKOGAWA HEWLETT PACKARD, LTD.) in accordance with JIS K 6911. When the surface resistivity of a sample was lower than $10^6 \Omega$, the surface resistivity thereof was measured using a Loresta HP (manufactured by Mitsubishi Kagaku Co., Ltd.) in accordance with JIS K 7194.

The surface resistivity of a wafer carrier sample was measured under applied voltage of 500 V using a Hiresta UP (manufactured by Mitsubishi Kagaku Co., Ltd.) and a probe (diameter of guide electrode: 10 mm; UR-SS probe) for micro samples. The measurement was conducted at 10 points on the molded product sample to show the maximum and minimum surface resistivities thereof.

(3) Modulus of Elasticity

The modulus of elasticity of each sample was measured in accordance with ASTM D 790.

Preparation Example 1

Preparation of Carbon Precursor $B_1$

A pressure container having an internal volume of 300 L and equipped with a stirring blade was charged with 68 kg of petroleum pitch having a softening point of 210° C., a quinoline-insoluble matter content of 1 wt. % and an H/C atomic ratio of 0.63 and 32 kg of naphthalene, and the contents were heated to 190° C. to mix and melt them. The resultant melt was then cooled and extruded to obtain a string-like formed product having a diameter of about 500 μm.

The string-like formed product was then ground so as to give a ratio of length to diameter of about 1.5, and the resultant ground product was poured into a 0.53% aqueous solution of polyvinyl alcohol (saponification degree: 88%) heated to 93° C. and dispersed therein under stirring. The resultant dispersion was then cooled to obtain spherical formed pitch. The spherical formed pitch was further filtered to remove water, and naphthalene in the spherical formed pitch was extracted out with n-hexane about 6 times as much as the formed pitch.

The spherical formed pitch obtained in this manner was held at 260° C. for 1 hour while introducing hot air, thereby conducting an oxidizing treatment to obtain oxidized pitch. The oxidized pitch was treated at 580° C. for 1 hour in a nitrogen stream and then ground to obtain particles of a carbon precursor having an average particle diameter of about 25 μm. The carbon content in the carbon precursor particles obtained in this manner was 91.0%.

In order to determine the volume resistivity of the carbon precursor, the oxidized pitch was ground, and particles having a diameter of 100 μm or greater was then sifted out by means of a mesh having an opening of about 100 μm. Thirteen grams of the thus-obtained ground oxidized pitch were charged into a cylindrical mold having a sectional area of 80 cm² to mold it under a pressure of 196 MPa, thereby obtaining a molded product. The molded product was treated in a nitrogen stream for 1 hour at 580° C. that is the same temperature as the heat treating temperature in the preparation process of the carbon precursor particles, thereby obtaining a sample for volume resistivity measurement of the carbon precursor. The volume resistivity of this sample was measured in accordance with JIS K 7194 and was found to be $3 \times 10^7$ $\Omega \cdot cm$.

Preparation Example 2

Preparation of Carbon Precursor $B_2$

Spherical formed pitch obtained in the same manner as in the preparation process of Carbon Precursor $B_1$ in Preparation Example 1 was held at 260° C. for 1 hour while introducing hot air, thereby conducting an oxidizing treatment to obtain oxidized pitch. The oxidized pitch was treated at 680° C. for 1 hour in a nitrogen stream and then ground to obtain particles of a carbon precursor having an average particle diameter of about 22 μm. The carbon content in the carbon precursor particles was 95.0%.

In order to determine the volume resistivity of the carbon precursor, the oxidized pitch was ground, and particles having a diameter of 100 μm or greater was then sifted out by means of a mesh having an opening of about 100 μm. Thirteen grams of the thus-obtained ground oxidized pitch were charged into a cylindrical mold having a sectional area of 80 cm² to mold it under a pressure of 196 MPa, thereby obtaining a molded product. The molded product was treated in a nitrogen stream for 1 hour at 680° C. that is the same temperature as the heat treating temperature in the preparation process of the carbon precursor particles, thereby obtaining a sample for volume resistivity measurement of the carbon precursor. The volume resistivity of this sample was measured in accordance with JIS K 7194 and was found to be $2 \times 10^4$ $\Omega \cdot cm$.

Preparation Example 3

Preparation of Carbon Precursor $B_3$

Spherical formed pitch obtained in the same manner as in the preparation process of Carbon Precursor $B_1$ in Preparation Example 1 was held at 260° C. for 1 hour while introducing hot air, thereby conducting an oxidizing treatment to obtain oxidized pitch. The oxidized pitch was treated at 800° C. for 1 hour in a nitrogen stream and then ground to obtain particles of a carbon precursor having an average particle diameter of about 27 μm. The carbon content in the carbon precursor particles was 98.0%.

In order to determine the volume resistivity of the carbon precursor, the oxidized pitch was ground, and particles having a diameter of 100 μm or greater was then sifted out by means of a mesh having an opening of about 100 μm. Thirteen grams of the thus-obtained ground oxidized pitch were charged into a cylindrical mold having a sectional area of 80 cm² to mold it under a pressure of 196 MPa, thereby obtaining a molded product. The molded product was treated in a nitrogen stream for 1 hour at 800° C. that is the same temperature as the heat treating temperature in the preparation process of the carbon precursor particles, thereby obtaining a sample for volume resistivity measurement of the carbon precursor. The volume resistivity of this sample was measured in accordance with JIS K 7194 and was found to be $5 \times 10^{-1}$ Ω·cm.

Preparation Example 4

Preparation of carbon precursor $B_4$

Carbon precursor particles having the carbon content of 91.0% was obtained in the same manner as in the Preparation Example 1. Thirteen grams of the thus-obtained carbon precursor particles were charged into a cylindrical mold having a sectional area of 80 cm² to mold it under a pressure of 196 MPa, thereby obtaining a molded product. The volume resistivity of this sample was measured in accordance with JIS K 7194 and was found to be $5 \times 10^7$ Ω·cm.

Examples 1 to 11 and Comparative Examples 1 to 6

Their corresponding components (numerical values indicate wt. %) shown in Table 1 were uniformly dry blended in a Henschel mixer, and each of the thus-obtained dry blends was fed to a twin-screw kneader extruder (PCM-45, manufactured by Ikegai Corp.) having a barrel diameter of 45 mm and melted and extruded, thereby preparing pellets. The pellets thus obtained were dried under reduced pressure and then fed to an injection molding machine (IS-75, manufacture by Toshiba Machine Co., Ltd.) to mold them, thereby forming flat plates (130 mm×100 mm×3 mm) for volume resistivity measurement. The results are shown in Tables 1 and 2.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Synthetic resin | | | | | | | | | | | |
| PPS | 50 | 50 | 50 | 50 | 50 | 50 | — | — | — | — | — |
| PBT | — | — | — | — | — | — | 50 | — | — | — | — |
| POM | — | — | — | — | — | — | — | 80 | — | — | — |
| PC | — | — | — | — | — | — | — | — | 79 | — | — |
| PP | — | — | — | — | — | — | — | — | — | 50 | — |
| PE | — | — | — | — | — | — | — | — | — | — | 84 |
| Carbon precursor | | | | | | | | | | | |
| $B_1$ | 6 | 7 | 10 | — | — | — | 7 | — | 7 | 5 | — |
| $B_2$ | — | — | — | 6 | 4 | 10 | — | 7 | — | — | 10 |
| $B_3$ | — | — | — | — | — | — | — | — | — | — | — |
| Conductive filler | | | | | | | | | | | |
| Graphite | 9 | — | — | 9 | 8 | 8 | 8 | 13 | 14 | 5 | 5 |
| Carbon black A | — | 7 | — | — | — | — | — | — | — | 3 | — |
| Carbon black B | — | — | 1 | — | — | — | — | — | — | — | 1 |
| Filler | | | | | | | | | | | |
| Glass fiber | 35 | 36 | 39 | 35 | 38 | 32 | 30 | — | — | 30 | — |
| Talc | — | — | — | — | — | — | 5 | — | — | — | — |
| Calcium carbonate | — | — | — | — | — | — | — | — | — | 7 | — |
| Volume resistivity Ω · cm | | | | | | | | | | | |
| Outer layer | 1E + 08 | 8E + 07 | 9E + 07 | 7E + 05 | 5E + 06 | 7E + 05 | 6E + 07 | 8E + 08 | 6E + 07 | 4E + 07 | 6E + 06 |
| Interior | 2E + 07 | 5E + 04 | 1E + 01 | 6E + 05 | 1E + 06 | 1E + 05 | 5E + 06 | 6E + 08 | 2E + 07 | 2E + 07 | 4E + 06 |

TABLE 2

|  | Comparative Example | | | | | |
| --- | --- | --- | --- | --- | --- | --- |
|  | 1 | 2 | 3 | 4 | 5 | 6 |
| Synthetic resin | | | | | | |
| PPS | 50 | 63.4 | 50 | 50 | 50 | — |
| PBT | — | — | — | — | — | 67.6 |
| POM | — | — | — | — | — | — |
| PC | — | — | — | — | — | — |
| PP | — | — | — | — | — | — |
| PE | — | — | — | — | — | — |
| Carbon precursor | | | | | | |
| $B_1$ | 20 | — | — | — | — | — |
| $B_2$ | — | — | — | — | — | — |
| $B_3$ | — | — | — | — | 7 | — |
| Conductive filler | | | | | | |
| Graphite | — | — | 15 | 17 | 7 | — |
| Carbon black A | — | — | — | — | — | — |
| Carbon black B | — | 1.6 | — | — | — | 2.4 |
| Filler | 30 | 35 | 35 | 33 | 36 | 30 |
| Glass fiber | — | — | — | — | — | — |
| Talc | — | — | — | — | — | — |
| Calcium carbonate | — | — | — | — | — | — |
| Volume resistivity $\Omega \cdot cm$ | | | | | | |
| Outer layer | 3E + 15 | 2E + 08 | 1E + 15 | 1E + 02 | 4E + 01 | 7E + 08 |
| Interior | — | 1E + 01 | — | — | — | 1E + 01 |

(Note)
(1) PPS: Poly(phenylene sulfide) (FORTRON KPS W205, product of Kureha Kagaku Kogy K.K.)
(2) PBT: Polybutylene terephthalate (Duranex 3300, product of Polyplastics Co., Ltd.)
(3) POM: Polyoxymethylene (Duracon M140; polyacetal, product of Polyplastics Co., Ltd.)
(4) PC: Polycarbonate (Lexan SP1110, product of Nippon GE Plastics Co., Ltd.)
(5) PP: Polypropylene (J107W, product of Gland Polymer Co., Ltd.)
(6) PE: Polyethylene (Novatec LJ80, product of Nippon Polychem Co., Ltd.)
(7) Graphite: Flake graphite (CB-150, product of Nippon Graphite Industry Co., Ltd.; volume resistivity: $1 \times 10^{-2} \Omega \cdot cm$)
(8) Carbon black A: DBP oil absorption 180 ml/100 g (Denka Black Powder, product of Denki Kagaku Kogyo Kabushiki Kaisha; volume resistivity: $1 \times 10^{-2} \Omega \cdot cm$)
(9) Carbon black B: DBP oil absorption 500 ml/100 g (Ketjen Black EC600JD, product of Lion Corporation; volume resistivity: $1 \times 10^{-2} \Omega \cdot cm$)
(10) Glass fiber: Diameter 13 $\mu$m (product of Nippon Electric Glass Co., Ltd.)
(11) Talc: Crown Talc DR, product of Matsumura Sangyo Co., Ltd.
(12) Calcium carbonate: Whiten P30, product of Shiraishi Kogyo Kaisha, Ltd.

As apparent from the results of Examples 1 to 3 shown in Table 1, when the carbon precursor (B) and the conductive filler (C) are used in combination, and the kind and blending proportion of the conductive filler are selected, the volume resistivities of the outer layer (surface part) and the interior of the molded product can be made substantially the same as each other (Example 1), or the volume resistivity of the interior can be made lower (Examples 2 and 3). In particular, when conductive carbon black having a high DBP oil absorption is added (Example 3), the volume resistivity of the interior can be brought close to a conductive region while keeping the volume resistivity of the outer layer in a moderately conductive region. Therefore, according to the present invention, the volume resistivities of the outer layer and the interior of a molded product can be controlled within respective desired ranges.

When Example 1 is compared with Example 4, it is understood that the degree of volume resistivity in a molded product can be controlled by varying the volume resistivity of the carbon precursor used. In view of Examples 4 to 6, it is understood that the volume resistivity of the synthetic resin composition is not very changed, but stable even when the proportion of the carbon precursor (B) is changed. Examples 7 to 11 indicate that synthetic resin compositions and molded products which are stable and even in volume resistivity can be provided even when the kind of the synthetic resin used is changed.

As apparent from the results of Comparative Example 1 shown in Table 2, the volume resistivity of the synthetic resin composition is scarcely lowered even when the carbon precursor alone is filled. From the results of Comparative Example 2, the volume resistivity of the interior of the molded product maintains low if the volume resistivity of the outer layer of the molded product is controlled to $2E+08(=2\times10^8)$ $\Omega$·cm when carbon black having a high DBP oil absorption is filled. Namely, it is impossible that the volume resistivity of the molded product is controlled to substantially the same level between the outer layer and the interior thereof. Comparative Example 6 indicates that the same results as in Comparative Example 2 are yielded even when the kind of the synthetic resin is changed from PPS to PBT. These synthetic resin compositions in Comparative Examples 2 and 6 are those the volume resistivity of the resulting molded products (outer layers) obtained from which are greatly changed by a slight change in injection molding conditions as shown in Comparative Examples 7 and 8 of the following Table 3.

From the results of Comparative Examples 3 and 4 shown in Table 2, it is understood that when graphite alone is filled, the volume resistivity of the resulting synthetic resin composition is rapidly changed according to changes in the filling amount of graphite, and it is difficult to precisely control the volume resistivity. From the results of Comparative Example 5, it is understood that when the volume resistivity of the carbon precursor is too low, the volume resistivity of the resulting synthetic resin composition cannot be controlled within the moderately conductive region.

Examples 12 and 13, and Comparative Examples 7 and 8

With respect to the respective synthetic resin compositions of Examples 1, Example 7, Comparative Example 2 and Comparative Example 6, flat plates for volume resistivity measurement were produced with injection speed upon injection molding varied as shown in Table 3, thereby measuring the volume resistivity (outer layer) of each flat plate. The results are shown in Table 3.

TABLE 3

| Injection speed | Ex. 12 Resin Composition of Ex. 1 | Ex. 13 Resin Composition of Ex. 7 | Comp. Ex. 7 Resin Composition of Comp. Ex. 2 | Comp. Ex. 8 Resin Composition of Comp. Ex. 6 |
|---|---|---|---|---|
| 20% | 2E + 08 | 8E + 07 | 3E + 09 | 4E + 09 |
| 30% | 1E + 08 | 6E + 07 | 2E + 08 | 7E + 08 |
| 45% | 1E + 08 | 4E + 07 | 7E + 06 | 2E + 06 |
| 60% | 8E + 07 | 4E + 07 | 1E + 06 | 1E + 05 |

As apparent from the experimental results shown in Table 3, it is understood that the volume resistivity of each molded product is stable scarcely depending on the injection molding conditions when the synthetic resin compositions according to the present invention are used (Examples 12 and 13), while the volume resistivity of each molded product is greatly changed by changes in injection conditions when the synthetic resin compositions produced by filling conductive carbon black alone are used (Comparative Examples 7 and 8).

Examples 14 to 19, and Comparative Examples 9 to 12

Respective component of a synthetic resin, carbon precursor, carbon fiber and carbon black were uniformly dry blended in a tumbler mixer on the basis of their corresponding formulations (numerical values indicate wt. %) shown in Table 4, and each of the thus-obtained dry blends was then fed to a twin-screw kneader extruder (PCM-45, manufactured by Ikegai Corp.) having a barrel diameter of 45 mm and melted and extruded, thereby preparing pellets. The pellets thus obtained were dried and then fed to an injection molding machine (IS-75, manufacture by Toshiba Machine Co., Ltd.) to form flat plates for surface resistivity measurement and specimens for flexural modulus measurement, thereby measuring the surface resistivity and flexural modulus of each sample. Further, these pellets were used to injection-mold wafer carriers of 332 mm×310 mm×301 mm in size to measure the surface resistivity of each carrier. The results are shown in Table 4.

TABLE 4

| | Example | | | | | | Comparative Example | | | |
|---|---|---|---|---|---|---|---|---|---|---|
| | 14 | 15 | 16 | 17 | 18 | 19 | 9 | 10 | 11 | 12 |
| Synthetic resin | | | | | | | | | | |
| PBT | 72 | 0 | 0 | 0 | 0 | 0 | 87 | 85 | 83 | 80 |
| PPS | 0 | 75 | 0 | 0 | 0 | 0 | 0 | 0 | 0 | 0 |
| PP | 0 | 0 | 65 | 0 | 0 | 0 | 0 | 0 | 0 | 0 |
| PFA | 0 | 0 | 0 | 67 | 0 | 0 | 0 | 0 | 0 | 0 |
| PC | 0 | 0 | 0 | 0 | 73 | 0 | 0 | 0 | 0 | 0 |
| PEEK | 0 | 0 | 0 | 0 | 0 | 69 | 0 | 0 | 0 | 0 |
| Carbon precursor ($B_4$) | 20 | 20 | 25 | 25 | 20 | 28 | 0 | 0 | 0 | 0 |
| Carbon fiber (PAN-based) | 8 | 5 | 10 | 8 | 7 | 6 | 13 | 15 | 0 | 0 |
| Carbon black | 0 | 0 | 0 | 0 | 0 | 0 | 0 | 0 | 17 | 20 |
| Surface resistivity (Ω) | 1E + 08 | 2E + 08 | 3E + 07 | 2E + 09 | 3E + 08 | 1E + 07 | 3E + 15 | 8E + 04 | 3E + 15 | 3E + 03 |
| Flexural modulus (MPa) | 6500 | 8000 | 5800 | 6000 | 6500 | 8500 | 11000 | 12000 | 3000 | 2900 |
| Surface resistivity of wafer carrier (Ω) | | | | | | | | | | |
| Minimum surface resistivity | 8E + 07 | 1E + 08 | 1E + 07 | 1E + 09 | 1E + 08 | 8E + 06 | 4E + 09 | 2E + 01 | 2E + 08 | 1E + 04 |
| Maximum surface resistivity | 3E + 08 | 5E + 08 | 4E + 07 | 5E + 09 | 4E + 08 | 2E + 07 | 5E + 15 | 5E + 12 | 5E + 15 | 3E + 12 |

(Note)
(1) PBT: Polybutylene terephthalate (Duranex 2002, product of Polyplastics Co., Ltd.)
(2) PPS: Poly(phenylene sulfide) (FORTRON KPS W214, product of Kureha Kagaku Kogyo K.K.)
(3) PP: Polypropylene (J109NW, product of Gland Polymer Co., Ltd.)
(4) PFA: Tetrafluoroethylene/perfluoroalkyl vinyl ether copolymer (P-63, product of Asahi Glass Co., Ltd.)
(5) PC: Polycarbonate (CARIBRE 351-15, product of SUMITOMO DOW LIMITED)
(6) PEEK: Poly(ether ketone) (450P, product of VICTREX CO.)
(7) Carbon black: Ketjen Black EC600JD, DBP oil absorption 500 ml/100 g (product of Lion Corporation)
(8) PAN-based carbon fiber: Besfight HTA 3000 (product of Toho Rayon Co., Ltd.; volume resistivity: $1 \times 10^{-3}$ Ω · cm)

As apparent from the results shown in Table 4, it is understood that when the carbon precursor (B) and the carbon fiber are used in combination (Examples 14 to 19), a surface resistivity in the moderately conductive region is exhibited in a narrow range of $1E+07(=1\times10^7)$ to $2E+09 (=2\times10^9)$ Ω, and moreover a flexural modulus of at least 5000 MPa is exhibited by filling the carbon fiber, and so stiffness required of large-sized wafer carriers and the like is achieved. Since these carriers have substantially the same surface resistivity at all points thereon and have no high-resistance portion, dust and the like suspended in the air are not collected. It goes without saying that these carriers has no possibility that semiconductor devices and the like may be broken down.

On the other hand, when the carbon fiber alone is contained in the synthetic resin (Comparative Examples 9 and 10), the surface resistivity is extremely changed by a slight difference in the content of the carbon fiber. It is therefore difficult to stably provide a molded product having a desired surface resistivity. A scatter of surface resistivity is observed on these carriers, and there is hence a problem from the viewpoint of practical use even in this point.

When the conductive carbon black alone is contained in the synthetic resin (Comparative Examples 11 and 12), the surface resistivity is extremely changed by a slight difference in the content of the conductive carbon black. It is therefore difficult to stably provide a molded product having a desired surface resistivity. In addition, the flexural modulus is at most 3000 MPa, and so stiffness required of large-sized wafer carriers and the like cannot be surely achieved. A scatter of surface resistivity is observed on these carriers, and there is hence a problem from the viewpoint of practical use even in this point.

INDUSTRIAL APPLICABILITY

According to the present invention, there can be provided synthetic resin compositions in which the volume resistivity can be strictly controlled to a desired value within a moderately conductive region, can be developed with good reproducibility and is scarcely varied by melt forming or molding conditions. According to the present invention, there are also provided synthetic resin compositions in which the volume resistivity of a formed or molded product obtained therefrom can be controlled so as to differ between the outer layer and the interior of the formed or molded product within a desired range as needed. According to the present invention, there are further provided formed or molded products obtained from such a synthetic resin composition. Such formed or molded products can be suitably applied to a wide variety of fields of which control of static electricity, prevention of electrification, electromagnetic interference shielding, prevention of dust collection, etc. are required.

According to the present invention, there are still further provided synthetic resin compositions in which the surface resistivity can be strictly controlled to a desired value within a moderately conductive region and developed with good reproducibility, the mechanical properties are excellent, and exudation of impurities is extremely small.

The formed or molded products obtained from the synthetic resin compositions according to the present invention are those in which the surface resistivity is in a moderately conductive region, the mechanical properties are excellent, and exudation of impurities is extremely small. The synthetic resin compositions according to the present invention are particularly suitable for use in forming carriers such as wafer carriers, in which the surface resistivity is within a range of $10^5$ to $10^{12}$Ω, the mechanical properties are excellent, and exudation of impurities is extremely small.

What is claimed is:

1. A synthetic resin composition comprising 40 to 98.5 wt. % of a synthetic resin (A), 1 to 40 wt. % of a carbon precursor (B) having a volume resistivity of $10^2$ to $10^{10}$ Ω·cm and 0.5 to 30 wt. % of at least one conductive filler (C) selected from the group consisting of a non-fibrous conductive filler and a metallic fibrous material, both having a volume resistivity lower than $10^2$ Ω·cm.

2. The synthetic resin composition according to claim 1, wherein the synthetic resin (A) is at least one selected from the group consisting of thermoplastic polyester, poly (arylene sulfides), polyolefins, polycarbonate, poly(ether ether ketone), polyacetal and fluorocarbon resins.

3. The synthetic resin composition according to claim 1, wherein the carbon precursor (B) is a calcined product obtained by calcining an organic substance in an inert atmosphere.

4. The synthetic resin composition according to claim 1, wherein the carbon precursor (B) is particles or fiber.

5. The synthetic resin composition according to claim 1, wherein the carbon precursor (B) has a carbon content of 80 to 97 wt. %.

6. The synthetic resin composition according to claim 1, wherein the non-fibrous conductive filler (C) is at least one conductive carbon material selected from the group consisting of graphite and conductive carbon black.

7. The synthetic resin composition according to claim 1, wherein the volume resistivity of the synthetic resin composition is $10^5$ to $10^{13}$ Ω·cm.

8. The synthetic resin composition according to claim 1, which further comprises 0 to 60 wt. % of at least one other filler (D).

9. The synthetic resin composition according to claim 8, wherein the other filler (D) is glass fiber, talc, calcium carbonate or a mixture thereof.

10. The synthetic resin composition according to claim 1, which comprises 46 to 98.5 wt. % of the synthetic resin (A), 1 to 40 wt. % of the carbon precursor (B) having a volume resistivity of $10^2$ to $10^{10}$ Ω·cm and 0.5 to 14 wt. % of the non-fibrous conductive filler (C) having a volume resistivity lower than $10^2$ Ω·cm.

11. A formed or molded product obtained from the synthetic resin composition according to claim 1.

12. The formed or molded product according to claim 11, comprising an outer layer and interior, wherein the volume resistivity of the outer layer is $10^5$ to $10^{13}$ Ω·cm, and the volume resistivity of the interior is not lower than $0.1\times10^1$ Ω·cm, but lower than $10^5$ Ω·cm.

13. A synthetic resin composition comprising 46 to 98.5 wt. % of a synthetic resin (A), 1 to 40 wt. % of a carbon precursor (B) having a volume resistivity of $10^2$ to $10^{10}$ Ω·cm and 0.5 to 14 wt. % of carbon fiber (E) having a volume resistivity lower than $10^2$ Ω·cm.

14. The synthetic resin composition according to claim 13, wherein the synthetic resin (A) is at least one selected from the group consisting of thermoplastic polyester, poly (arylene sulfides), polyolefins, polycarbonate, poly(ether ether ketone), polyacetal and fluorocarbon resins.

15. The synthetic resin composition according to claim 13, wherein the carbon precursor (B) is a calcined product obtained by calcining an organic substance in an inert atmosphere.

16. The synthetic resin composition according to claim 13, wherein the carbon precursor (B) is particles or fiber.

17. The synthetic resin composition according to claim 13, wherein the carbon precursor (B) has a carbon content of 80 to 97 wt. %.

18. The synthetic resin composition according to claim 13, wherein the carbon fiber (E) is polyacrylonitrile-based carbon fiber, pitch-based carbon fiber or a mixture thereof.

19. The synthetic resin composition according to claim 18, wherein the carbon fiber (E) is polyacrylonitrile-based carbon fiber.

20. The synthetic resin composition according to claim 13, which further comprises 0 to 60 wt. % of at least one other filler (D).

21. The synthetic resin composition according to claim 20, wherein the other filler (D) is glass fiber, talc, calcium carbonate or a mixture thereof.

22. The synthetic resin composition according to claim 13, wherein the surface resistivity of the synthetic resin composition is $10^5$ to $10^{12}\Omega$.

23. A formed or molded product obtained from the synthetic resin composition according to claim 13.

24. The formed or molded product according to claim 23, which is a carrier for wafers, semiconductor devices, electronic parts or information recording media.

* * * * *